(No Model.)  2 Sheets—Sheet 2.
H. R. JOHNSON.
STAR FINDER.
No. 395,058. Patented Dec. 25, 1888.
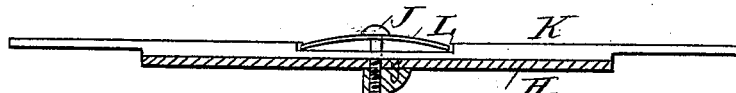
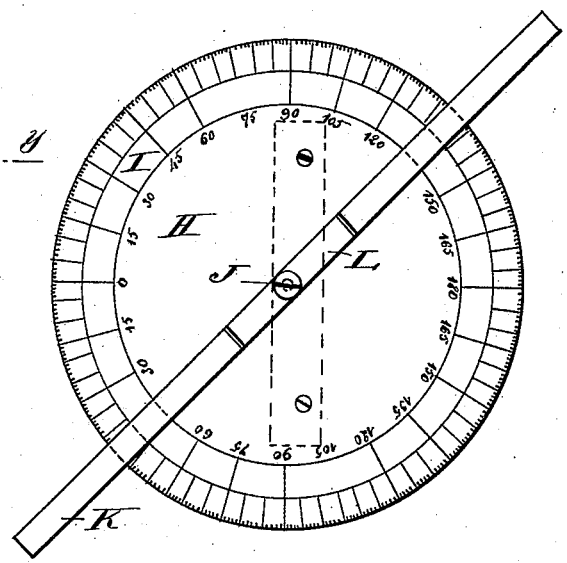
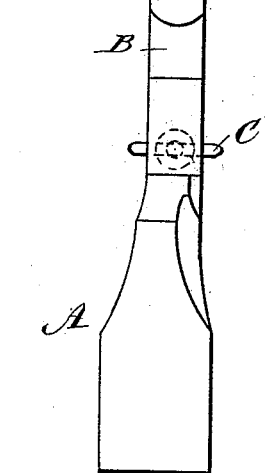
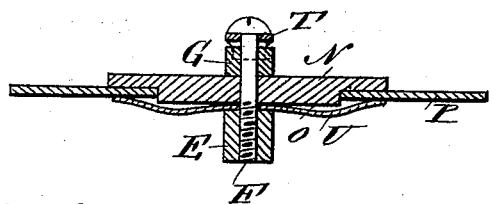
WITNESSES:
C. Neveux
C. Sedgwick
INVENTOR:
H. R. Johnson
BY Munn & Co.
ATTORNEYS.
N. PETERS, Photo-Lithographer, Washington, D. C.

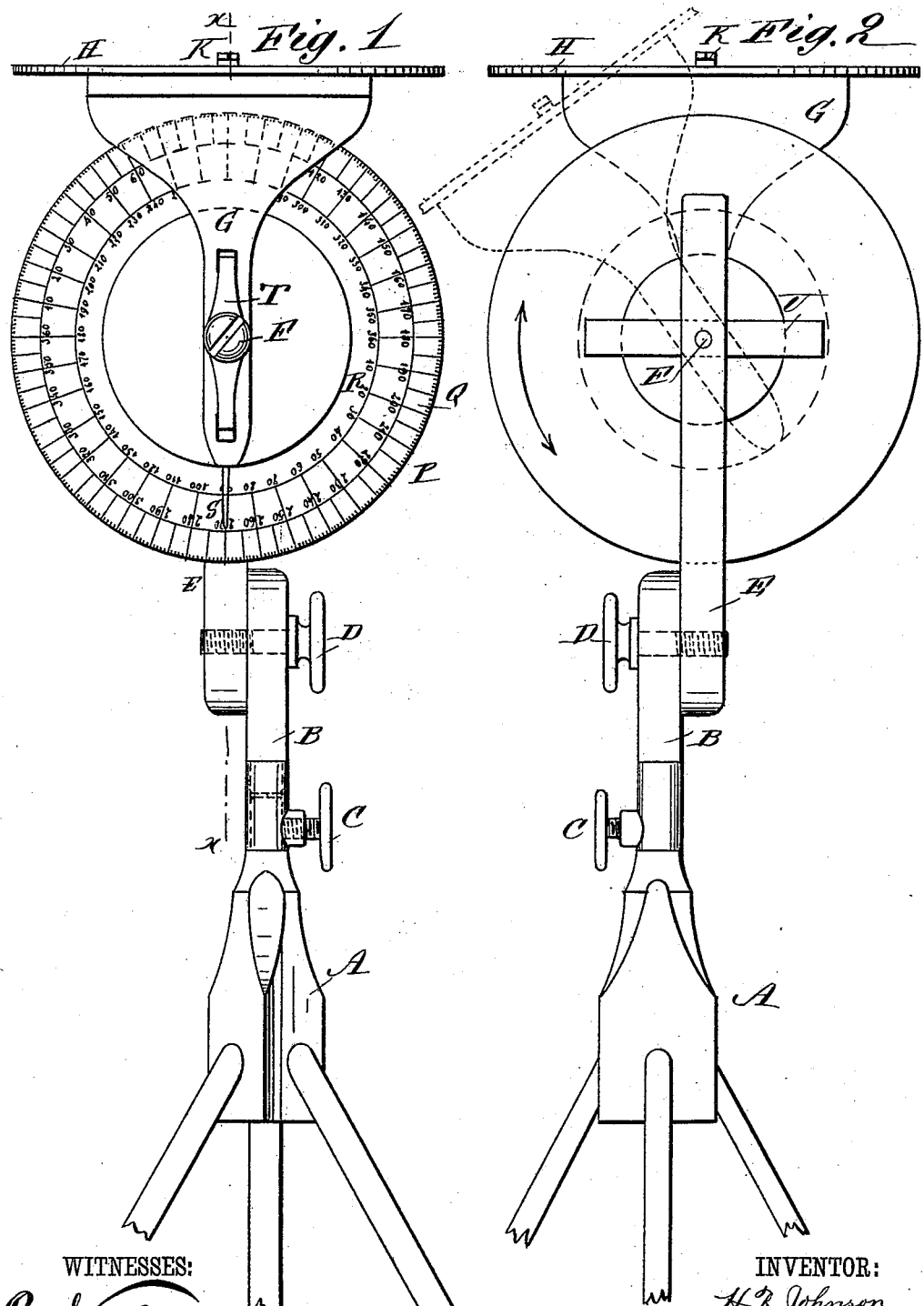

UNITED STATES PATENT OFFICE.

HUBERT R. JOHNSON, OF NATRONA, PENNSYLVANIA.

STAR-FINDER.

SPECIFICATION forming part of Letters Patent No. 395,058, dated December 25, 1888.

Application filed June 30, 1888. Serial No. 278,694. (No model.)

*To all whom it may concern:*

Be it known that I, HUBERT R. JOHNSON, of Natrona, in the county of Allegheny and State of Pennsylvania, have invented a new and Improved Star-Finder, of which the following is a full, clear, and exact description.

The object of the invention is to provide a new and improved astronomical instrument for finding the location of heavenly objects—such as stars, planets, nebulæ, &c.—the names of which are known and for finding the names of heavenly objects the locations of which are known.

The invention consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a front elevation of the improvement. Fig. 2 is a rear elevation of the same. Fig. 3 is a sectional side elevation of the same on the line $x\ x$ of Fig. 1. Fig. 4 is a plan view of the improvement. Fig. 5 is a sectional plan view of the same on the line $y\ y$ of Fig. 3, and Fig. 6 is a table giving the polar distances and right ascension.

On a suitably-constructed tripod, A, is mounted to turn an arm, B, held in any desired position on the said tripod A by a set-screw, C, screwing in the tripod A and against the lower part of the arm B. The upper part of the arm B supports a clamping-screw, D, on which is held to turn the upwardly-extending arm E, carrying a screw, F, on which is held to turn an arm, G, supporting at its upper end a disk, H, held at right angles to the said arm G and provided on top with a graduation, I, representing degrees and subdivisions of degrees arranged in a circle from 0 to 180° and back to 0, as is plainly shown in Fig. 4. In the center of the disk H is secured a screw, J, on which is mounted to turn a pointer, K, which may be a plain piece of wood or metal or a small telescope. The ends of the pointer K preferably project beyond the periphery of the disk H. The pointer K is pressed firmly in contact with the disk H by a spring, L, held under the head of the bolt J and resting with its ends on the pointer K, as shown in Figs. 3 and 4.

On the upper part of the arm E is secured a disk, N, held centrally on the screw F at the rear of the arm G, above described. Said disk N is provided with an annular hub or offset, O, on which is mounted to turn loosely a disk, P, which then stands at right angles to the disk H and is provided on its front face with the graduations Q and R, of which the graduation Q represents the distances from 0 to 360°, and the graduation R represents similar distances, but is arranged in such a manner in relation to the degrees of the graduation Q that the mark for 180° on the graduation R ends at the 0 point of the graduation Q, and the 0 point of the graduation R is at the mark for 180° of the graduation Q, as is plainly shown in Fig. 1. On the graduations Q and R indicate a pointer, S, formed on the lower end of the arm G, as is plainly shown in Figs. 2 and 3.

The arm G is pressed firmly in contact with the front of the disk N by means of a spring, T, held under the head of the screw F, its free ends resting on the said arm G, and the disk P is pressed against the back of the disk N in a similar manner by a spring, U, held on the screw F between the arm E and the offset O, its free ends pressing against the said disk P, as is plainly shown in Fig. 5. The springs L, T, and U permit a convenient turning of the pointer K, the arm G, and the disk P, respectively, but at the same time hold the said parts in position after being adjusted to any desired point.

The instrument as above described is used in connection with a table, part of which is illustrated in Fig. 6, and in which the north polar distances and the right ascension of each star or other heavenly object are given.

The operation is as follows: When the operator desires to find the location of a heavenly object the name of which he knows, he proceeds in the following manner: The tripod A is set up at a convenient place in the open air, and then the operator turns the pointer K until it stands at 0 and 180°, which points are opposite each other on the graduation, the 0-mark pointing northward and the mark for 180° southward or downward, after which he loosens the screws C and D and turns the arms B and E until the pointer K points to the North Star in the constellation Ursa Minor. The operator then tightens the clamping-screws C and D, so that the arms E and B become fixed on the tripod A. After adjusting the instrument as described, the pointer K is moved to 39° on the left side of the graduation I on the disk H, and then the arm G is turned on the screw F until the pointer K is in line with the end star of the constellation of Ursa Major, which constellation the operator is supposed to know. When this star and the pointer K coincide, the operator turns the graduated disk P until the mark for 205° of the graduation Q is under the pointer S. Thus it will be seen that the arm E is first adjusted to one fixed point in the heavens (the North Star) and then the disk P is adjusted to a second fixed point—the end star of Ursa Major. When the operator now desires to find, for instance, the star Alpha in the constellation of Orion, he refers to the table shown in Fig. 6, and there finds the north polar distance of that star to be 35°, and he also finds the right ascension of this particular star to be 205°. The operator now turns the pointer K until it indicates the degrees above given on the disk H, and then turns the arm G until the pointer S indicates the degrees of the right ascension on the graduation Q on the disk P. The pointer K will then point to the star Alpha in the constellation of Orion. Thus by adjusting the pointer K to the north polar distance of any given heavenly object, and then adjusting the arm G with its pointer S to the right ascension of the same heavenly object, the operator can easily find the location of the said heavenly object, as the pointer K then points in the direction of the object sought. In a similar manner the operator can find the name of a heavenly object he sees with the naked eye, and of which he does not know the name, by first setting the instrument in such a position that the pointer K is in line with the north polar star, as above described, and then turning the arm G and the pointer K until the latter is in line with the object of which the name is not known to the operator. The operator then reads off the degrees on the disk H at which the pointer stands and reads off the degrees on the disk P in the graduation Q at which the pointer S stands, and then refers to the table shown in Fig. 6, in which, by comparison of the north polar distance and the right ascension, he will find the name of the star or other heavenly body he had been observing.

The graduation R on the disk P is for the purpose of finding the number of degrees on the disk P in case the arm G with its pointer S cannot be turned far enough. In this case the operator turns the pointer S to 25° on the inner graduation, R, which it is always sure to reach.

It will be seen that the name of any star can be found, and any star of which the name is known can also be found, at the same time any visible constellation can be easily determined and a fixed cluster of stars—such as the Hyades, Pleiades, &c.—can be easily located. The point on the horizon where a star will rise or set can be determined by proper use of the instrument, and the part of the heavens in which a certain star will be at any given hour can be conveniently located, and the course of a star across the sky can be marked out, and when the operator desires he can easily determine at what time a star will rise or set or be in any part of its course at a given time. The Zodiac can be traced by the pointer K, and the instrument can also be used for assistance in finding comets. No knowledge of astronomy is necessary in order to use the instrument, and any number of persons may enjoy the use of the instrument together. It is operated by one person, but a number of persons can view the object in turn.

Having thus described my invention, I claim as new and desire to secure by Letters Patent—

In a star-finder, the combination, with the arm E, of the arm G, provided with the pointer S, the disk N, provided with the offset O, the graduated disk P, fitting on the offset of the said disk, the screw F, passing through the arm G, the disk N, and arm E, the spring F, having its ends bearing against the said arm G, the spring U, having its ends bearing against the disk P, the disk H, the pointer K, the screw J, and the spring L, having its ends resting against the pointer K, substantially as herein shown and described.

HUBERT R. JOHNSON.

Witnesses:
 WESLEY G. MEAD,
 R. L. OTTERMAN.